United States Patent

Orlandi et al.

[11] 4,055,219
[45] Oct. 25, 1977

[54] ELECTRIC TIP-OFF HEAT SINK

[75] Inventors: John Victor Orlandi, Pine Plains; Neil Myron Poley; Donald Miller Wilson, both of Kingston, all of N.Y.

[73] Assignee: IBM Corporation, Armonk, N.Y.

[21] Appl. No.: 479,720

[22] Filed: June 17, 1974

[51] Int. Cl.² .............. F28F 7/00; F28F 13/00; H05B 3/58

[52] U.S. Cl. .................. 219/390; 165/80; 165/134; 165/135; 165/185; 219/530; 219/535; 425/384; 432/249; 432/253

[58] Field of Search ............ 219/390, 530, 535; 432/249, 253; 165/185, 80, 135, 134; 49/2 E, 2; 425/384

[56] References Cited

U.S. PATENT DOCUMENTS

| | | | |
|---|---|---|---|
| 3,002,076 | 9/1961 | Massey | 219/535 |
| 3,100,251 | 8/1963 | Johnson | 219/390 |
| 3,217,793 | 11/1965 | Coe | 165/185 X |
| 3,390,373 | 6/1968 | Ruston | 165/185 X |
| 3,552,630 | 1/1971 | Dean | 165/185 X |
| 3,765,475 | 10/1973 | Hooper | 165/80 X |
| 3,843,300 | 10/1974 | McFarlane | 425/384 |

Primary Examiner—Carroll B. Dority, Jr.
Assistant Examiner—Sheldon Richter
Attorney, Agent, or Firm—W. S. Robertson

[57] ABSTRACT

During the construction of display gas panels front and back panels are connected together by means of a seal which forms a chamber for receiving a display gas. A hole is provided in the back plate which is outside the display viewing area and a glass tube is fitted into this hole and sealed to the assembly. The tube is used to first evacuate and then admit display gas into the chamber. An electric tip-off oven is used to collapse the tube stem to form a permanent seal. A cast protective heat sink and a reflective foil wafer are used to protect the gas panel and the tube-to-gas panel interface from damage by the oven.

2 Claims, 1 Drawing Figure

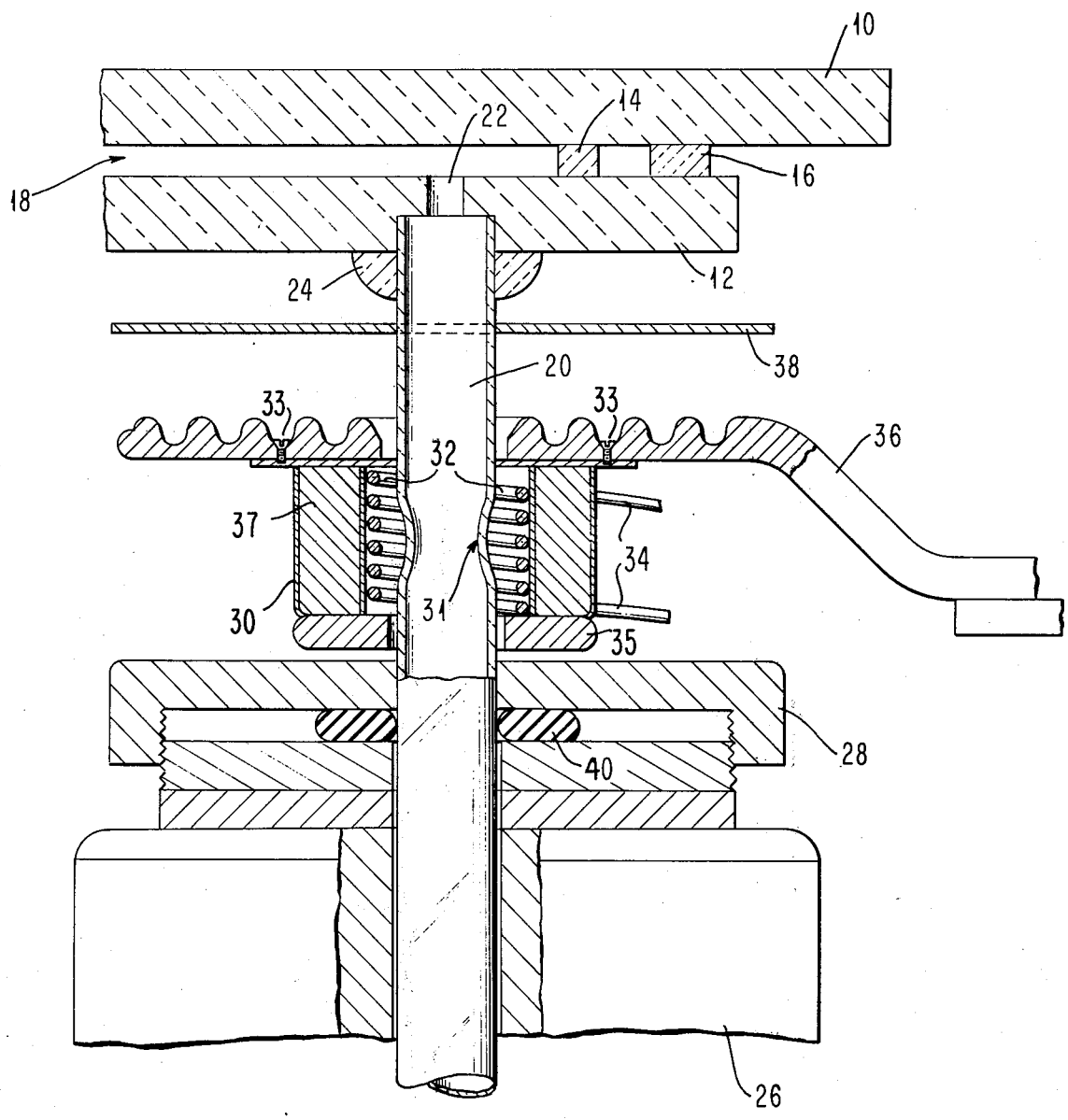

ELECTRIC TIP-OFF HEAT SINK

BACKGROUND OF THE INVENTION

The invention relates to apparatus used in the fabrication of gas panels and more particularly to an improved apparatus for protecting the gas panel assembly from damage from heat during fabrication.

DESCRIPTION OF PRIOR ART

In the prior art electric tip-off could not be performed without raising and lowering the temperature of the gas panel. During this process cracking of the panel glass frequently occurs due to stress. Electric tip-off during electronic vacuum tube fabrication does not have this problem because temperature rising from the internal heater helps to relieve the stress on the tube. Since a gas panel has a completely different configuration there being no heater within the panel, a new means for electric tip-off is necessary.

SUMMARY OF THE INVENTION

It is a primary object of this invention to provide apparatus for protecting a gas panel assembly from damage from heat during an electric tip-off operation.

A further object of this invention is to provide an electric tip-off tool which can be operated in close proximity with the tabulation seal between the tube to be tipped off and the body to which it is attached.

Briefly, the above objects are accmplished in accordance with the invention by an electric tip-off oven which encircles the tube to be collapsed and is provided with a protective heat sink between the oven and the gas panel assembly.

Between the heat sink and the gas panel assembly is a reflective wafer, the purpose of which is to reduce the radiation from the heat sink.

BRIEF DESCRIPTION OF THE DRAWING

The foregoing and other objects, features and advantages of the invention will be apparent from the following more particular description of a preferred embodiment of the invention as illustrated in the accompanying drawing.

The drawing is a side elevational view, partly in section, showing a portion of a gas panel assembly with the exhaust port, tip-off oven, and heat sink in place during the fabrication thereof in accordance with the invention.

An automatic tip-off oven suitable for modification in accordance with the present invention is manufactured by Shawfrank Engineering Corp., 6 North River Road, Des Plains, Ill. 60616, and is described at P. 12 in their descriptive brochure No. 14805 969-03 (d: 3).

Referring now to the drawing, a gas panel display in the process of fabrication is shown. A front panel subassembly 10 and a back panel assembly 12 are held in a fixed spaced relationship relative to each other by a glass spacer 14. A glass seal 16 joins panels 10 and 12 together so as to form an inner chamber 18. This chamber is evacuated and filled with an appropriate display gas. In order to accomplish this, a glass tube 20 is fitted into a step-down cylindrical hole 22 and is joined to the back panel 12 by a glass seal 24. At this point in the construction the partially completed back panel is placed in an oven for bake-out, backfill and sealing. The tube 20 is connected to a water cooled exhaust port 26 which is sealed to the tube by means of a port nut 28 which is fitted with an appropriate expandable washer 30 which expands to form a seal between the glass tube and exhaust port when the nut 28 is tightened. The chamber 18 is evacuated and backfilled with the display gas. After the display gas is in the chamber, the tube 20 is melted at its necked-down portion 31 to seal off the open end of the tube to thereby completely seal the display gas within the chamber 18. The melting process is accomplished by means of a heater coil element 32 which completely encircles the glass tube. The heater coil element is heated by passing electric current through wires 34 which are connected to an appropriate electrical source. In order to protect the display panel from injury by heat from the heater element, a protective heat sink 36 is positioned between the display panel and the heater coil element 32. In addition to the heat sink a reflective wafer 38 is attached to the tube 20 by force fit to reflect the radiating heat from the heat sink away from the surface of the gas panel assembly.

While the invention has been particularly shown and described with reference to a preferred embodiment thereof, it will be understood by those skilled in the art that various changes in form and details may be made therein without departing from the spirit and scope of the invention.

What is claimed is:

1. For use during the course of fabricating a gas panel, wherein as part of said fabrication process a partly completed gas panel is placed in a vacuum oven for a bake out, backfill and sealing and wherein a glass tubular member inserted into said gas panel is used for evacuating gaseous contaminants from said gas panel and thereafter is sealed by means of an oven which encircles said member, said oven having a heater coil element and a relatively thin supporting structure that is in part located between the heater element and the gas panel, apparatus for protecting said gas panel from thermal damage by heat radiated from said oven comprising:

a separate heat sink mounted on the part of the oven supporting structure that is located between the heater coil element and the gas panel between said oven and said gas panel said heat sink being relatively thicker than said oven supporting structure and in thermal conductive contact with said oven for providing a thermal conductive path from said oven through said heat sink and away from said gas panel.

2. The combination according to claim 1 wherein said apparatus further comprises a reflective foil wafer placed between said heat sink and said gas panel for reflecting heat radiation away from said gas panel.

* * * * *